Sept. 28, 1926.
J. DAW
1,601,201
POWER SAW
Filed Sept. 11, 1924    3 Sheets-Sheet 1
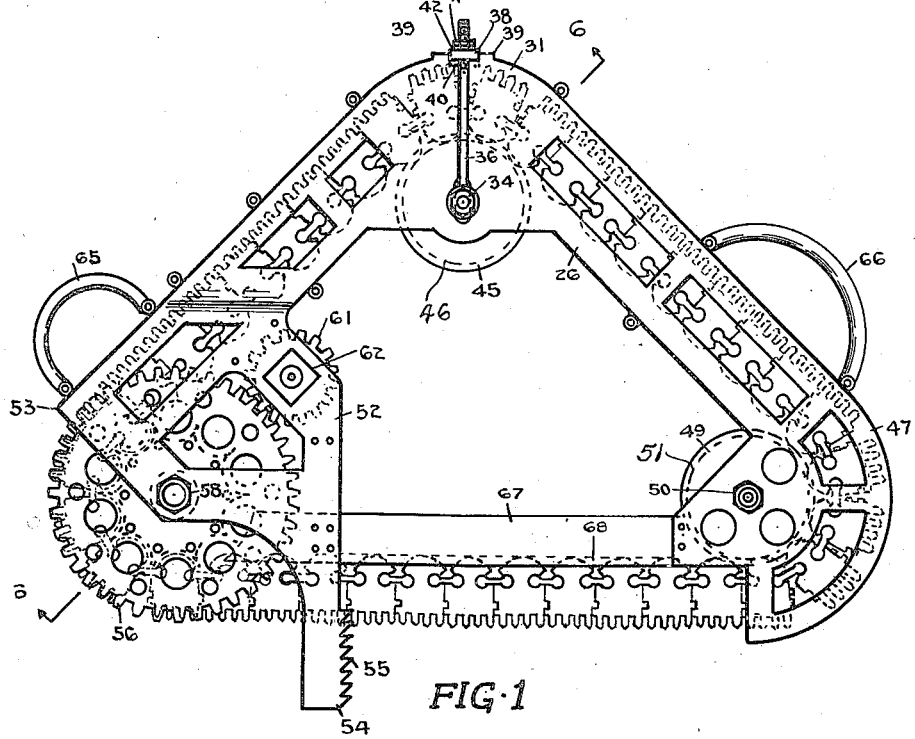
FIG·1
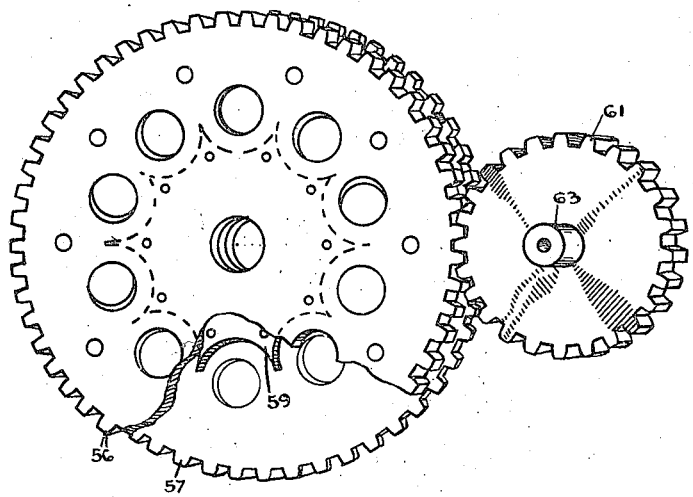
FIG·3.
INVENTOR
J. Daw.
By E.J. Fetherstonhaugh.
ATTORNEY.

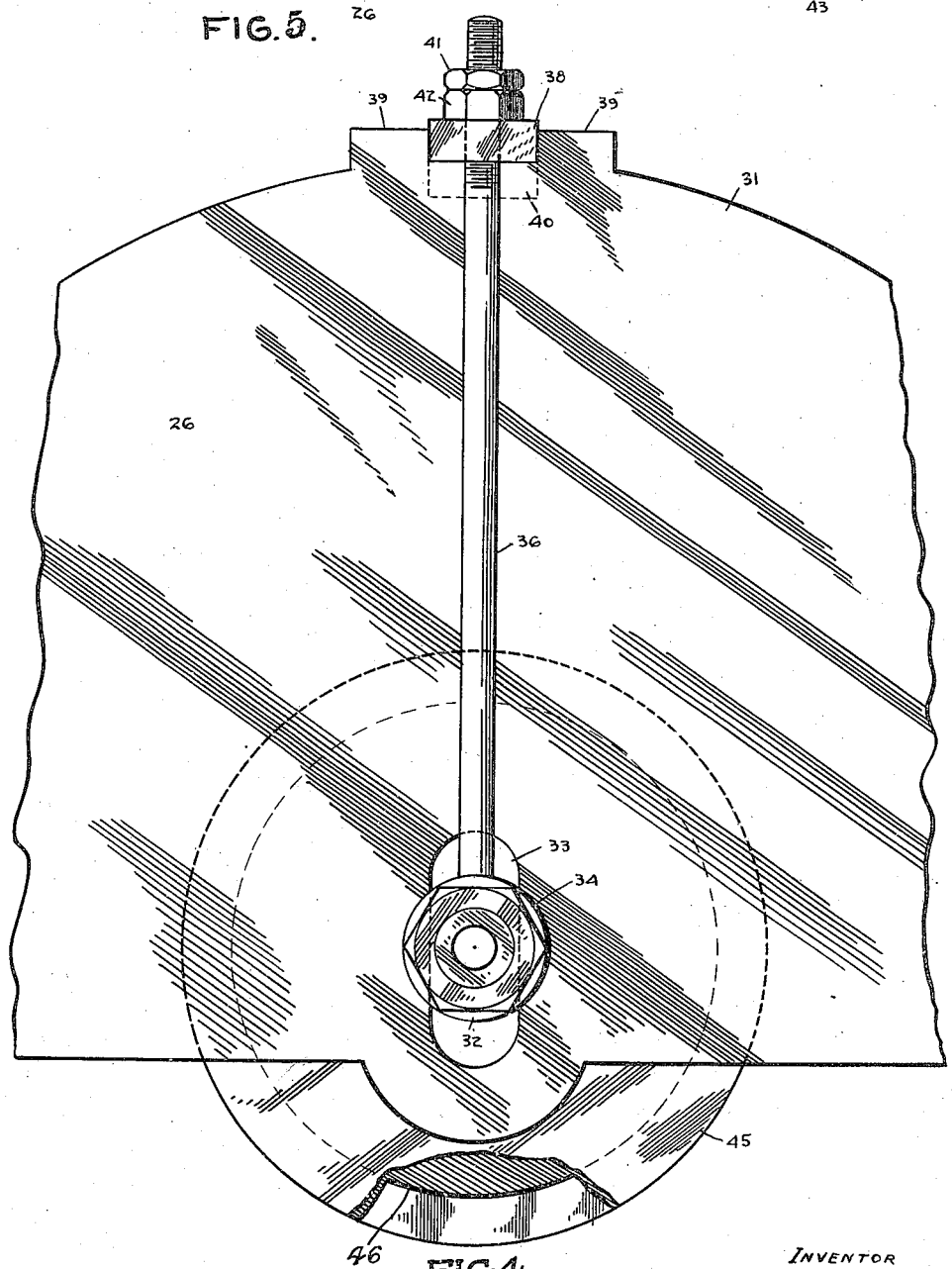

Patented Sept. 28, 1926.

1,601,201

UNITED STATES PATENT OFFICE.

JOSEPH DAW, OF QUEBEC, QUEBEC, CANADA, ASSIGNOR TO BROWN COMPANY, OF BERLIN, NEW HAMPSHIRE.

POWER SAW.

Application filed September 11, 1924. Serial No. 737,147.

The invention relates to a power saw as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to facilitate the felling of trees particularly those of the smaller diameter used in the manufacture of paper stock; to insure celerity and efficiency, to enable the workman to pass from tree to tree and thus cover large areas of timber in a comparatively short period in respect to other methods of felling; to simplify the mechanism in such devices and thereby reduce the cost of maintenance and avoid delays in the matter of effecting repairs; to furnish a readily portable saw for various purposes such as for metal and stone cutting and other industrial or domestic work; and generally to provide a serviceable and durable saw easy to operate and effective in its work.

In the drawings,

Figure 1 is a plan view of the assembled mechanism.

Figure 3 is an enlarged perspective detail of the driving gear.

Figure 4 is an enlarged sectional detail of the tightener.

Figure 5 is a cross sectional view on the line 6—6 in Figure 1.

Like numerals of reference indicate corresponding parts in the various figures.

Figure 2:
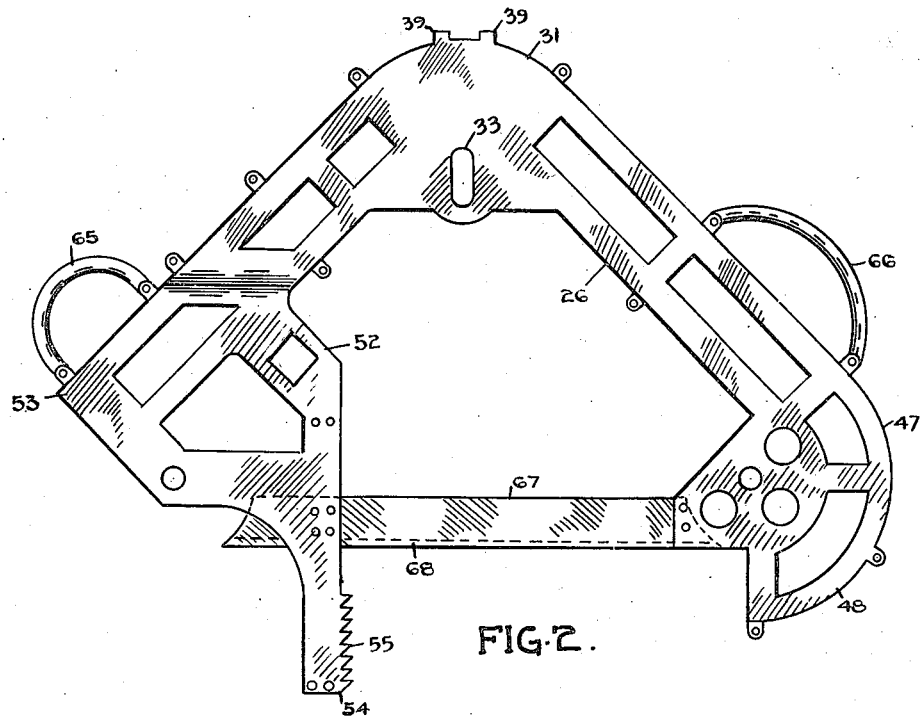
Figure 2 is a detail of the frame.

Referring to the drawings the angular frame 26 is in bar form being closed on the outer and inner sides and having opening at the top and bottom and formed of the upper and lower pieces 27 and 28 bolted together through the flanges 29 and 30.

This frame 26 is extended at the angle to form the bearing frame 31 and the bearing 32 is mounted in said frame 31 in the slot 33 and engaged by the upper and lower rings 34 and 35 of the tightener, from which the rods 36 and 37 extend outwardly across the frame 26 over the top and bottom sides and through the block 38, the latter fitting between the lugs 39 from the frame and having a centering tongue 40 between the frame members. The nuts 41 and 42 respectively hold the rods 36 and 37 and the nuts 43 and 44 hold the rings 34 and 35 respectively.

The sprocket idler 45 is journalled in the bearing 32 and is formed with groove 46 concaved correspondingly to receive the back teeth of the chain saw and from the description of the tightener it will be readily understood that the saw can be drawn up by turning the nuts on the rods after loosening the nuts holding the rings at the ends of said rods.

The bearing frame 47 extends inwardly from the rounded end 48 of the frame 26 and the sprocket idler 49 is journalled in the bearing 50 in said frame 47 and is formed with the groove 51 concaved to correspond with the back teeth 18.

The bearing frame 52 extends inwardly from the other end 53 of the main frame 26 and from this bearing frame 52 the tree grip 54 projects forwardly and is made with the teeth 55 bevelled in an inward direction.

The main gear wheels 56 and 57 are journalled in the bearing 58 in the frame 52 and these gears are spaced by the driving sprocket wheel 59, which is formed with the long sprocket teeth 18 to receive the chain saw for driving purposes.

The driving pinion 61 is journalled in the bearings 62 in the frame 52 and meshes with the two gears 56 and 57 and the shaft 63 of the pinion 61 is operatively connected to the flexible shaft 64 and the latter to any suitable power driven machine, in most cases a portable electric motor readily movable from one timber area to another.

The handles 65 and 66 are rigidly secured to or form part of the frame 26 and are situated respectively at either side.

The bridge piece 67 joins the frames 47 and 52 being securely riveted centrally between the upper and lower plates of said frames and is arranged in the same plane with the saw blade, so that it may follow in the saw cut made and at the same time guide the arc-shaped teeth on the back of the saw sections in the groove 68.

The chain saw is mounted on the driving sprocket 59 and idlers 49 and 45 and properly tightened as explained, therefore the gears 56 and 57 will serve as guides for the chain saw which travels therebetween.

In the operation of this saw the workman carries it to the tree and applies the grip 54 and with the saw in action the tree is very quickly felled. The power is applied to the driving pinion as explained and this drives the double gear and rotates the driving sprocket and consequently the chain saw is driven. The arc-shaped teeth of the saw are engaged in the correspondingly formed sprocket driving wheel and thus keep the saw in motion while the idler at the other end of the frame insures a straight length of saw across the frame opening, this being the only exposed portion of the cutting edge.

There is no necessity to stop the saw in cutting operations from tree to tree, though the motion may be arrested at any time by cutting off the power or releasing the connection in a suitable manner.

What I claim is:—

1. A chain saw having flexibly linked teeth forming sprocket chain teeth, a portable frame formed of several parts secured together over and housing the non-cutting portions of said saw and forming bearing frames having bearings, and sprockets journalled in said bearings, one of said sprockets having a main gear wheel on either side of it intermeshing with a driving pinion secured in said frame, said driving sprocket operating said chain saw in and across said frame on the several sprockets.

2. A chain saw having flexibly linked teeth forming sprocket chain teeth, a portable frame formed of several parts secured together over and housing the non-cutting portions of said saw and forming bearing frames having bearings, sprockets journalled in said bearings and acting as idlers and a driving member for said chain saw, main gear wheels on either side of one of said sprockets and a pinion driving said gear wheels, said chain saw being driven by said driving sprocket in and across said frame.

3. A chain saw having flexibly linked teeth forming sprocket chain teeth, a portable frame formed of several parts secured together over and housing the non-cutting portions of said saw, bearing frames in said portable frame having bearings, sprocket wheels mounted in said bearings and carrying said chain saw, a double gear having one of said sprocket wheels therebetween, a driven pinion mounted in a bearing of the frame and engaging said gears and positioned in the frame at a point at right angles to the length of the cutting saw across the open end of the portable frame.

Signed at Montreal, this 25th day of August 1924.

JOSEPH DAW.